Figure 1:
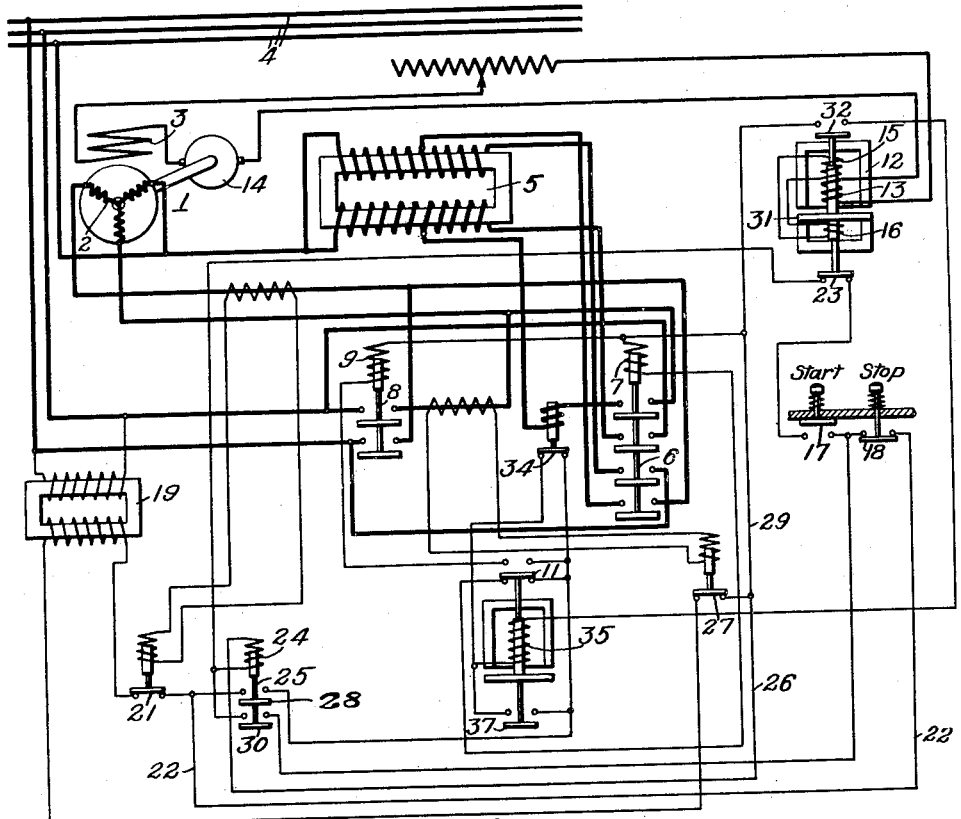

Aug. 28, 1928.

H. KING 1,682,380

STARTING SYSTEM FOR ELECTRIC MOTORS

Filed July 19, 1920

WITNESSES:
J. A. Helsel
J. R. Langley

INVENTOR
Harvey King
BY
Wesley F. Carr
ATTORNEY

Patented Aug. 28, 1928.

1,682,380

UNITED STATES PATENT OFFICE.

HARVEY KING, OF PITTSBURGH, PENNSYLVANIA, ASSIGNOR TO WESTINGHOUSE ELECTRIC & MANUFACTURING COMPANY, A CORPORATION OF PENNSYLVANIA.

STARTING SYSTEM FOR ELECTRIC MOTORS.

Application filed July 19, 1920. Serial No. 397,409.

My invention relates to starting systems for electric motors, and it has particular relation to such systems as may be employed in connection with synchronous motors.

My invention has for its object to provide a system whereby synchronous motors may be automatically accelerated and normal running connections may be established upon their reaching synchronism.

In starting synchronous motors, as practiced heretofore, considerable difficulty has been encountered in determining the proper instant at which the running connections should be established. It has been necessary to employ synchronizing devices of various kinds which indicate, to the operator, the approximate instant at which the motor reaches synchronous speed. Such devices have proved unsatisfactory because it has been necessary to rely upon the judgment of the operator.

According to the present invention, I employ an arrangement whereby, upon the operation of a single manually-operable switch, the motor is automatically accelerated to synchronous speed and the normal running connections of the motor are established either at the instant of its reaching synchronism or in accordance with desired conditions thereafter. The transfer from starting connections to running connections is controlled by a transfer relay that is, in turn, controlled in accordance with current conditions in the field-magnet winding of the motor.

It has been observed, in connection with experiments to determine the various characteristics of synchronous motors, that, if the field circuit of such motor be closed during the starting operation, the circuit is traversed by an alternating current of substantially constant value. The current remains at such constant value substantially from standstill to synchronous speed. The value of the current falls suddenly to substantially zero when the motor reaches synchronous speed.

The value of the current in the field circuit is substantially constant, by reason of the fact that the reactance of the field circuit is relatively high while the resistance is relatively low. The electromotive force induced in the field-magnet winding by the transformer action of the motor decreases as the motor approaches synchronism by reason of the increased speed of the motor. The decrease in electromotive force is compensated for by the diminished reactance because of the lower frequency of the induced current. Accordingly, the decrease in electromotive force does not operate to cause a corresponding decrease in the value of the current and the latter remains substantially constant.

The field current of substantially constant value is utilized to control a relay mechanism in such manner that the starting connections are maintained until the motor reaches synchronism. At that instant, the relay mechanism is permitted to open by reason of the sudden change in the value of the current, and a transfer relay operates to open the starting connections and to establish the normal running connections of the motor. The operation of the relay mechanism may, however, be delayed until the direct current of the exciter has reached a predetermined value.

Figure 2:
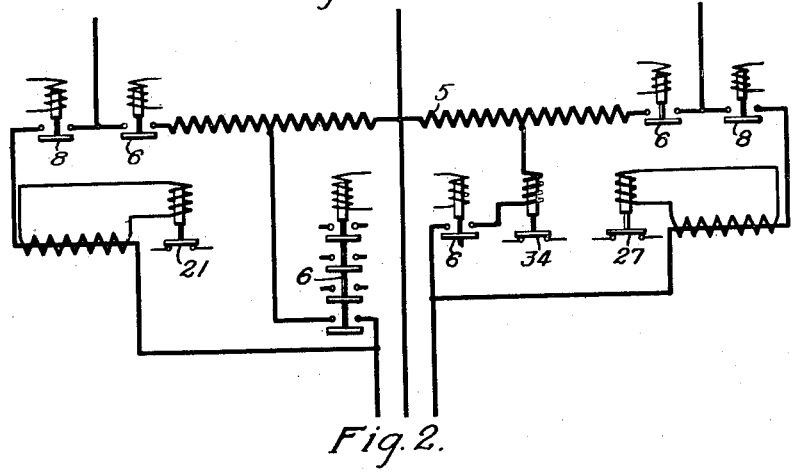

In the accompanying drawing,

Figure 1 is a diagrammatic view of such an apparatus embodying my invention, and Fig. 2 is a schematic arrangement of the principal circuit of the system of Fig. 1.

Referring to the drawing, an alternating-current motor 1 of the synchronous type has a primary winding 2 and a field-magnet winding 3. The primary winding 2 is supplied with energy from line conductors 4 which may be connected to any suitable source of alternating current. The primary winding 2 is supplied with energy at reduced voltage through an auto transformer 5 and a "starting" switch 6 having an actuating coil 7. A "running" switch 8, having an actuating coil 9, connects the motor directly to the line.

A transfer relay 11 controls the operation of the switches 6 and 8. The operation of the transfer relay 11 is controlled by a relay mechanism 12 which may be termed a "lockout" relay. The lockout relay 12 has a coil 13 that is connected in series with the field-magnet winding 3 and the armature 14 of an exciter generator that is directly connected to the motor 1. The relay 12 is provided also with two coils 15 and 16 which are in series with each other and which are inductively related to the coil 13. The operation of the system is controlled by two push-button switches 17 and 18 that are respectively designated by the legends "Start" and "Stop".

To start the motor, the push-button switch 17 is depressed to close a circuit which extends from one terminal of a current transformer 19 through overload relay 21, conductor 22, push-button switches 18 and 17, contact member 23 of relay 12, coil 24 of low-voltage relay 25, conductor 26 and overload relay 27 to the other terminal of current transformer 19. The low-voltage relay 25 then closes to complete a circuit which extends from one terminal of the current transformer 19 through overload relay 21, contact member 28 of relay 25, transfer relay 11, which is in its lower position, actuating coil 7 of starting switch 6, conductor 29 and overload relay 27 to the other terminal of current transformer 19. The push-button switch 17 may be released at any time after the closing of the low-voltage relay 25 by reason of the fact that it is shunted by the lower contact member 30 of the relay.

The starting switch 6 then closes to connect the winding 2 to low-voltage terminals of the auto transformer 5. A relatively high electromotive force is induced in the field-magnet winding 3 because of the movement between the rapidly rotating flux of the winding 2 and the initially stationary field-magnet winding 3, which is carried by the rotor of the motor. The coil 13 of the relay 12 is, accordingly, energized by alternating current of relatively high frequency. The coils 15 and 16, which are inductively related to the coil 13, are accordingly energized to a corresponding degree. The voltage of the exciter 14 is very low at the beginning of the starting operation and may, therefore, be neglected in considering initial conditions.

It will be noted that the magnetic circuit of the coil 16 is closed by an armature member 31 while the magnetic circuit of coils 13 and 15 is open at air gaps immediately above the armature member 31 so long as the latter is in its lower position. The armature 31 is, therefore, maintained in its lower position so long as the alternating current traversing the field circuit is of an appreciable value.

When the motor is at substantially synchronous speed, the alternating current traversing the field circuit falls to substantially zero value and coils 15 and 16 are, accordingly, substantially de-energized. The voltage of the exciter 14 has increased to substantially normal value and the force of the coil 13, tending to actuate the armature 31 and the contact member 32 to their respective upper positions, is substantially unopposed. The coil 13 may be designed to operate at any desired value of the exciting current in order to insure proper field excitation.

The contact member 32 completes a circuit which extends from one terminal of the current transformer 19 through overload relay 21, contact member 28 of low-voltage relay 25, relay 34, actuating coil 35 of transfer relay 11, contact member 32 of relay 12 and overload relay 27 to the other terminal of current transformer 19.

The transfer relay 11 is actuated to its upper position to open the circuit of coil 7 of starting switch 6 and to complete the circuit of actuating coil 9 of running switch 8. The switch 6 opens to disconnect the motor from the auto transformer 5 and to connect the motor directly to the line. The motor now operates under normal running conditions with normal line voltage applied to its primary winding. An interlock 37 connected to the relay 11 completes a holding circuit for the coil 35 of the relay upon the closing of the latter.

To stop the motor, it is only necessary to depress push-button switch 18 which effects the opening of the circuit of actuating coil 24 of low-voltage relay 25 through contact member 30 of the latter relay. The opening of low-voltage relay 25 effects the opening of the control circuit and the switch 8 opens to disconnect the motor from the line. The lookout relay 12 and the transfer relay 11 are actuated by gravity to their illustrated positions. The system is now in readiness for the succeeding starting operation.

By means of the arrangement described above, a synchronous motor may be started and accelerated to synchronous speed upon the operation of a single push-button switch. The running connections are established upon the occurrence of any desired conditions after the motor reaches synchronous speed. Such action is dependent upon a characteristic of the motor which causes full voltage to be applied to the motor at such time as to insure the motor remaining in synchronism. The starting operations are effected accurately and are performed in a uniform manner because they are dependent upon a characteristic of the motor that is invariable under corresponding conditions.

I claim as my invention:

1. The combination with a synchronous electric motor having a primary winding and a field-magnet winding, of means dependent upon the frequency of the alternating current and the value of the direct current traversing said field-magnet winding for controlling the circuit of said primary winding.

2. The combination with a synchronous electric motor having a primary winding and a field-magnet winding, of means in circuit with said field-magnet winding for varying the connections of said primary winding only when the direct current traversing said field-magnet winding exceeds a predetermined value and the alternating current traversing said field-magnet winding is below a predetermined value.

3. The combination with a synchronous alternating-current motor having a primary winding and a field-magnet winding, of electromagnetic means for controlling the circuit connections of said primary winding in accordance with the value of the direct current traversing said field-magnet winding and the value of the alternating current traversing said field-magnet winding.

4. The combination with a synchronous alternating-current motor having a primary winding and a field-magnet winding, of electromagnetic means for controlling the circuit connections of said primary winding in accordance with current conditions in the circuit of said field-magnet winding, said means comprising a relay having a coil in circuit with said winding tending to actuate said relay and a second coil inductively related to the first-named coil tending to prevent the actuation of said relay.

5. The combination with a synchronous alternating-current motor having a primary winding and a field-magnet winding, of electromagnetic means for controlling the circuit connections of said primary winding, said means comprising a movable member controlled in accordance with predetermined mininum and maximum values, respectively, of the alternating and direct currents traversing said field-magnet winding.

6. The combination with a synchronous electric motor having a primary winding and a field-magnet winding, of means for applying a plurality of voltages to said primary winding and means for changing the value of the applied voltage in accordance with respective values of the direct current and the alternating current traversing said field-magnet winding during the starting of said motor.

7. The combination with a synchronous electric motor having a primary winding and a field-magnet winding, of means for applying a plurality of voltages to said primary winding, a source of direct-current energy in circuit with said field-magnet winding, and means operable in accordance with the respective values of the direct current and the alternating current traversing said field-magnet winding for controlling the values of the voltage applied to said primary winding.

8. The combination with a synchronous alternating-current motor having a primary winding and a field-magnet winding of electromagnetic means for controlling the circuit connections of said primary winding in accordance with the value of the direct current traversing said field-magnet winding and the value of the alternating current traversing said field-magnet winding, said electromagnetic means comprising a coil responsive to direct current, and a second coil responsive to alternating current only.

9. The combination with a synchronous alternating-current motor having a primary winding and a field-magnet winding, of electromagnetic means for controlling the circuit connections of said primary winding in accordance with the value of the direct current traversing said field-magnet winding and the value of the alternating current traversing said field-magnet winding, said electromagnetic means comprising a coil responsive to direct current and to alternating current, and a second coil inductively related to the first-named coil.

10. The combination with a synchronous electric motor having a primary winding and a field-magnet winding, of means in circuit with said field-magnet winding for varying the connections of said primary winding only when the direct current traversing said field-magnet winding exceeds a predetermined value and the alternating current traversing said field-magnet winding is below a predetermined value, said electromagnetic means comprising an armature member, a coil responsive to direct current for actuating said armature member and a second coil responsive to alternating current for opposing the force of the first-named coil.

11. The combination with a synchronous electric motor having a primary winding and a field-magnet winding, of means in circuit with said field-magnet winding for varying the connections of said primary winding only when the direct current traversing said field-magnet winding exceeds a predetermined value and the alternating current traversing said field-magnet winding is below a predetermined value, said electromagnetic means comprising an armature member, a coil responsive to direct current and to alternating current for actuating said armature member, and a second coil inductively related to the first-named coil for opposing the actuation of said armature member.

12. The combination with a synchronous electric motor having a primary winding and a field-magnet winding, of an exciter directly connected to said motor, and means for effecting the establishing of running connections for said motor when the values of the direct current supplied by said exciter and the alternating current supplied by said field-magnet winding have predetermined relation during starting.

In testimony whereof, I have hereunto subscribed my name this 13th day of July, 1920.

HARVEY KING.